(12) United States Patent
Dimitroff et al.

(10) Patent No.: US 6,295,578 B1
(45) Date of Patent: Sep. 25, 2001

(54) CASCADED REMOVABLE MEDIA DATA STORAGE SYSTEM

(75) Inventors: John E. Dimitroff; David L. Grant, both of Houston, TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/288,889

(22) Filed: Apr. 9, 1999

(51) Int. Cl.[7] ................................................. G06F 12/00
(52) U.S. Cl. .................... 711/114; 711/111; 711/112; 711/113; 711/147; 711/154; 711/155; 709/211; 709/212; 709/213; 710/110
(58) Field of Search .................... 711/111–114, 161–162, 711/154–156, 147; 710/110, 101, 200; 709/211–213

(56) References Cited

U.S. PATENT DOCUMENTS

| | | | |
|---|---|---|---|
| 5,163,131 | 11/1992 | Row et al. | 709/202 |
| 5,355,453 | 10/1994 | Row et al. | 709/209 |
| 5,592,462 * | 1/1997 | Beldock et al. | 369/273 |
| 5,611,056 * | 3/1997 | Hotchkin | 710/101 |
| 5,657,455 * | 8/1997 | Gates et al. | 710/100 |
| 5,812,754 * | 9/1998 | Lui et al. | 714/6 |
| 5,892,955 * | 4/1999 | Ofer | 710/200 |

* cited by examiner

*Primary Examiner*—Than Nguyen
(74) *Attorney, Agent, or Firm*—Fletcher, Yoder & Van Someren

(57) ABSTRACT

A cascaded removable media data storage system includes a first level enhanced removable media data storage system controller connected to a host or server computer network. Connected in parallel to the enhanced first level removable media data storage system controller are at least two enhanced second level removable media data storage system controllers. Each enhanced second level removable media data storage system controllers is connected to a mirrored group of removable media data storage units.

19 Claims, 13 Drawing Sheets

CASCADED REMOVABLE MEDIA DATA STORAGE SYSTEM

FIELD OF THE INVENTION

The present invention pertains to secondary or back-up data storage systems for individual computers or computer networks; more particularly, the present invention pertains to an improved data system for secondary or back-up storage of data on removable media such as tape cartridges.

BACKGROUND OF THE INVENTION

Computer Data Storage

Computer data storage which is co-located with a host, server, or an individual computer is placed in a section of computer memory designated primary storage. This primary storage provides the computer with the capability to process program instructions, to store input data, to retain statements from programs undergoing processing, to retain and use data produced by programs undergoing processing, and to format data in preparation for output.

Initially data which goes into the computer is held in primary storage until the data is used during the processing of program instructions. During processing of the data by the computer, the primary storage is used to store the intermediate and final results of all arithmetic and logical operations. Intermediate results are temporarily retained in storage areas which are often referred to as working storage. Working storage areas are specifically set aside for the temporary storage of data while a program is being run on one or more computers. While the computer is running the program and using the data, the computer may be acting as if all program instructions and needed data are resident in its main memory; however, the program instructions and data may actually be located miles away at another location and downloaded into the computer as if resident in the computer's primary storage. Such storage configuration is called virtual storage. The final results from the running of a computer program are transferred to storage areas that have been designated by the program instructions. These final results will remain at the designated storage areas until output operations begin.

In addition to storing the data involved in processing, the primary storage of a computer must retain the program instructions used for processing data. As computer applications have become more sophisticated, the size of computer programs has grown exponentially. Such exponential growth in the size of computer programs has necessitated the use of virtual storage of computer programs or data in locations away from the host or server computer to enable sufficient space in primary storage to run other large computer programs.

For example, a large international bank may have a designated time each day to consolidate all of the transactions from its branches around the world. Once this daily consolidation has taken place, the massive amount of consolidated data must be stored somewhere for later use in putting together periodic account statements and to provide the specialized reports necessary to meet regulatory and tax requirements. Such specialized reports could not be run unless the bank's computer had access to large virtual data storage capacity.

Secondary or Back-up Data Storage

Because of the ever growing need for data storage capacity to service larger and larger computers which run larger and larger programs—all of which produce massive amounts of data—the need has arisen for larger and more sophisticated secondary or back-up data storage systems.

Secondary data storage provides a computer system with greater data processing potential because it expands the amount of available storage space to a computer or a computer network for holding data. The data contained in secondary or back-up data storage may be too large to be held in primary or working storage; however, to allow the program resident in the host or server computer network to run, data storage space must be located and made available to the host or server computer as quickly as possible for data writing and data reading operations. By providing a host or server computer network with large amounts of secondary or back-up data storage capacity, the operational capabilities of individual computers or a computer network can be maximized.

Removable Media

One of the most used forms of secondary or back-up data storage device hardware is a removable media data storage unit. While slower and possibly more cumbersome than other types of secondary data storage, removable media data storage units such as tape cartridges remain a viable and frequently used data storage option because of its low cost and acceptance around the world.

Because of the way data is actually placed on one or more individual removable media data storage units, a removable media data storage system includes a controller to govern its operation. The removable media data storage system controller is used to divide computer programs and associated data into sections to guide the data being written onto one or more removable media data storage units from the host or server computer network to an individual removable media data storage unit. Such guidance from the removable media data storage system controller as to the path by which data is written on one or more individual removable media data storage units should be invisible to the host or server network. Rather, all the host or server computer network needs to retain is a "volume number" designating the location of the stored data. The term "volume number" actually comes from early magnetic tape data storage systems where a volume number was the identification number of a single reel of magnetic tape. Presently, a "volume number" may identify a single removable media data storage unit or a group of removable media data storage units where data is written to or read from.

When stored data is to be read back to one or more computers in a network of host or server computers, the removable media data storage system controller retrieves the stored data from the one or more removable media data storage units where it is actually stored and supplies the stored data to the host or server computer as if the data came from a single volume number location.

Data Storage on Multiple Removable Media Units

Because one of the problems in reading and writing data onto individual removable media data storage units is the lack of speed in the sequential access of data, the speed of either writing to or reading from secondary or back-up data storage on a removable media data storage unit has been greatly increased by the use of mass removable media data storage systems such as mass tape cartridge data storage systems which employ strips of magnetic tape in an ordered array. In these mass tape cartridge data storage systems, any data recorded in a tape cartridge can be accessed directly without having to search the entire contents of the tape cartridge.

In many removable media data storage systems, data is stored by a process known as striping. In striping a serial or linear sequence of groups or bytes of data is downloaded by parallel data groups into parallel groups of individual removable media data storage units. (In early magnetic tape data storage systems, bytes of data were written sequentially in a serial manner onto a single roll of magnetic tape. The single roll of magnetic tape then had to be either wound or unwound to gain access to the correct length of magnetic tape holding the needed data to read the needed data back into the computer.) Thus, if seven individual removable media data storage units are available for data storage, data can be written to storage on the removable media data storage unit or read from storage on the removable media data storage unit in groups of seven stripes.

Access to groups of individual removable media data storage units is typically accomplished by the use of robotic control or a robot. The removable media data storage system controller directs the robot to the group of individual removable media data storage units on which data is written to or read from. The robot then locates the appropriate group of individual removable media data storage units designated by the removable media data storage system controller for proper storage or retrieval of data. While the data may be written to or read from a group of individual removable media data storage units, the host or server network sees the data being written to or read from the removable media secondary or back-up data storage facility as being written to or read from a single virtual volume designated by single volume number or a single volume number including the location of a group of individual removable media data storage units. The formulation of the single virtual volume designation is accomplished by the removable media data storage system controller.

Commonly available removable media data storage systems or removable media data storage libraries include 15 removable media data storage units. This library of 15 removable media data storage units may be configured into two sets of seven removable media data storage units (with a spare in case a removable media data storage unit is out for service or cleaning). Sets of seven removable media data storage units are configured by the removable media data storage system controller to appear to a host or server in a computer network as a single volume number. Some manufacturers have found that as few as five removable media data storage units can be configured together so that a computer in a host or server network will still see the group of five removable media data storage units as a single volume number.

To increase secondary data storage capacity on removable media data storage systems, such as magnetic tape cartridge data storage system attempts have been made to serially connect together a string of mass magnetic tape cartridge data storage systems I, II, . . . , n as shown in FIG. 1. While additional secondary magnetic tape cartridge data storage capacity can be provided by this serial connection of magnetic tape cartridge data storage systems, the serial connection causes other problems to arise. Specifically, the serial connection S between the mass magnetic tape cartridge data storage systems limits access to other on-line magnetic tape cartridge data storage systems so that only one mass magnetic tape cartridge data storage system can be written to or read from at anyone one time. Thus, while a write operation or a read operation is taking place on one mass magnetic tape cartridge data storage system on the serial connection S, the remainder of the mass magnetic tape cartridge data storage systems on the serial connection S are rendered unusable.

Other Secondary Data Storage Systems

In addition to magnetic tape cartridge data storage, there are other systems associated with the secondary storage of computer data. Such other systems include compact disks (often called CD-ROM's), magnetic disks, magnetic drums, data cells, optical memory data storage systems, magnetic bubble data storage systems, laser storage systems, holographic data storage systems, optical scanners, printers and storage medium changers. A group of these secondary data storage systems has become known in the industry as a Redundant Array of Independent Data Storage Devices or a RAID. A numeral suffix indicates the number of data storage devices available, e.g. RAID3. Each individual storage device within a RAID is identified by its own Logical Unit Number or LUN for address purposes.

Many individual secondary data storage systems have operational protocols that are significantly different than the operational protocols used to store data on other individual secondary data storage systems. For example, the output of a typical magnetic tape cartridge data storage controller will not permit writing data to or reading data from anything other than magnetic tape. Other types of more advanced secondary storage systems are able to write data into storage or read data from storage in any format and therefore are completely compatible with and will accept data passed through a system using another storage medium. Some in the industry have referred to a RAID or a grouping or an array of data storage devices with shared data storage capacity as a Storage Area Network.

Demands on Removable Media Secondary Storage Systems

In addition to providing a large amount of secondary data storage capacity on removable media data storage units, there are still other requirements that are placed on secondary data storage systems which use removable media data storage units. Such other requirements include: (a) back up secondary data storage capacity, (b) recreation of secondary data storage, and (c) fault tolerance or the ability to provide a location for data storage should one or more individual removable media data storage units become inoperable or unavailable when the data is to be written on or read from one or more removable media data storage units. One method of meeting the need for backup secondary storage capacity, the need to recreate secondary data storage and the need for fault tolerance is to provide a second, redundant, identical array of data storage capacity. The process of providing a second, redundant array of data storage capacity is known in the industry as "mirroring." To prevent unforseen occurrences such as power failures, fires, earthquakes, storms, or sabotage from interfering with the writing on and reading from removable media data storage unit, such mirrored removable media data storage units may be located thousands of miles apart.

Finally, there is the ever present demand for greater speed in both writing data to storage and reading data from removable media data storage units to meet the requirements of newer computers that can process data at ever increasing speeds. To meet the demand for greater speed in both writing data to and reading data from removable media data storage units, removable media data storage units must be both able to physically transfer data faster to and from removable media data storage units as well as provide increased availability of those removable media data storage units not in use.

SUMMARY

The cascaded removable media data storage system of the present invention provides the following advantages:

i) increased back-up or secondary data storage capacity;

ii) greater fault tolerance; and iii) increased speed for both writing data to back-up storage and reading data from secondary back-up storage.

The foregoing advantages are provided by arranging a system of removable media data storage system S libraries into a cascade. By connecting the removable media data storage system controller of one or more removable media data storage units together into a cascade, the entire cascaded data storage system provides the supported computer network with increased data storage capacity, enhanced performance, and better availability of storage system capacity in the event of a data storage fault (fault tolerance).

In its preferred embodiment, the basic removable media data storage system of the present invention includes three, five channel-removable media data storage system controllers. The first level five channel-removable media data storage system controller is linked directly to the host or server computer network and then configured for either a mirrored array or RAID data transfer to secondary data storage. Two second level five channel-removable media data storage system controllers are each attached to a back-end channel of the first five channel-removable media data storage system controller. One or more removable media data storage units is connected to each of the two second level five channel-removable media data storage system controllers.

Both the first level and the second level five channel-removable media data storage system controllers allow for full operational speed of the removable media data storage system with little or no memory buffering for temporary storage of data during either the data writing or data reading process. In addition, each of the five channel-removable media data storage system controllers provides for the virtualizing of the commands which provide for multiple operation of the removable media data storage units. For example, the control of the robot by the second level removable media data storage system controller actually connected to one or more removable media data storage units being used must appear to be a single robot to the first level removable media data storage system controller which is connected to the other second level removable media data storage system controller. All of the second level removable media data storage system controllers connected to the removable media data storage units must make it appear to the first level removable media data storage system controller as if but one robot were in operation.

In alternate embodiments of the invention, other RAID's may be used together with the basic removable media data storage system. In still other alternate embodiments of the invention, additional removable media data storage units may be added to the basic removable media data storage system.

DESCRIPTION OF THE DRAWINGS

A better understanding of the cascaded removable media data storage system array of the present invention may be had by references to the figures wherein.

DESCRIPTION OF THE EMBODIMENTS

Purpose of the Invention

Figure 1:
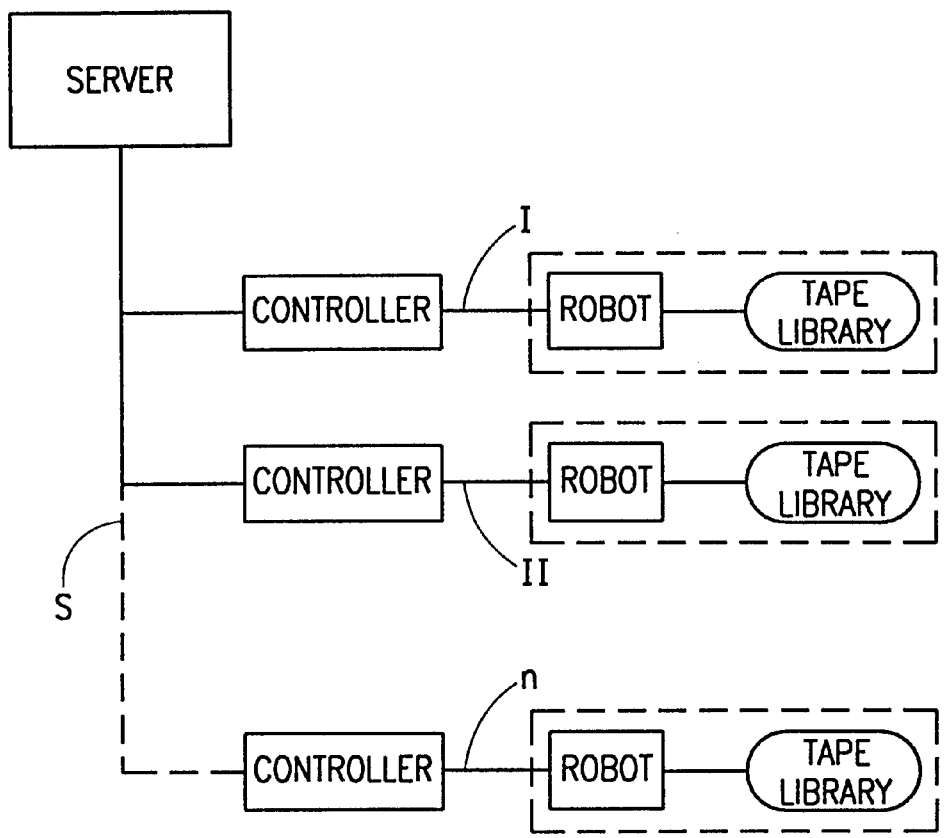
FIG. 1 is a schematic representation of a prior art magnetic tape cartridge data storage system utilizing a serial connection.
Figure 2:
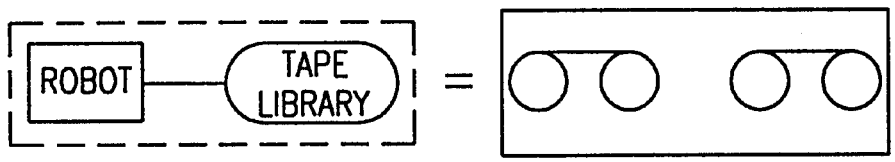
FIG. 2 illustrates the symbology used in the following drawing figures to designate a removable media data storage unit.

The purpose of the cascaded removable media data storage system of the present invention is to increase data transfer rates both to and from one or more removable media data storage units, to increase the storage capacity of a secondary or back-up network of removable media data storage units, and to increase the fault tolerance of a removable media data storage system. The disclosed cascaded removable media data storage system of the present invention is completely independent of the host computer system and does not rely on any particular host computer network system architecture to be operational. Further, the disclosed cascaded removable media data storage system is completely stand alone as it does not rely on any outside command or control.

General Description

In a general sense, the present invention includes removable media data storage system controllers with added or enhanced capabilities that are connected together in a variety of cascades to achieve a highly fault tolerant removable media data storage system that features high performance, high capacity and high fault tolerance. Independent groups of removable media data storage units or other secondary or back-up data storage systems may be added to the basic cascaded removable media data storage system of the present invention to further increase the capacity of the data storage system.

Problems to be Solved

To enable the operability of the cascaded removable media data storage system of the present invention it was discovered that the following problems had to be solved.

i) Command delays from one removable media data storage system controller to another;

ii) Virtualization of robotic commands—even though there may be more than one removable media data storage medium changer, all must appear as just one to the host or server computer network; that is, a command sent to a removable media data storage medium changer must cause all removable media data storage medium changers to execute that command;

iii) Virtualization of slots in the removable media data storage medium changers—the removable media data storage controller must be able to group removable media data storage units together so that when a new volume is requested by the host or server computer network, the correct series of removable media data storage units are loaded together in the proper sequence to make the group of removable media data storage units appear as but one removable media data storage unit to the host or server computer network.

Enhanced Removable Media Data Storage System Controllers

Accordingly, in general, the enhanced removable media data storage system controllers which implement the cascaded removable media data storage system of the present invention each have the capability to:

i) Reduce command delays from one removable media data storage system controller to the next;

ii) Virtualize robotic commands for removable media data storage units; and iii) Virtualize slots in the removable media data storage medium changer.

More specifically, each removable media data storage system controller must be aware of whether or not it is connected to another removable media data storage system controller, and it must not interfere with the operation of the cascaded removable media data storage system as a whole. Each removable media data storage system controller need not be able to fully communicate with another connected removable media data storage system controller in the cascade. For example, in a pass-through mode, when a removable media data storage unit is in use, such in-use information would be passed upward through the second level removable media data storage system controller through a first level removable media data storage system controller to the host computer. To accomplish this pass-through of in-use information the removable media data storage system controllers must be aware of their position in the cascade. That is, a removable media data storage system controller must be aware of whether it is in a first level position or a second level position in a cascade. Since the host computer either writes to or reads from one or more individual removable media data storage units, the signal sent to or received from the one or more removable media data storage units is virtualized to appear to the host computer as a single volume number. Therefore, the removable media data storage system controller must be able to virtualize certain commands from a host or server computer network directed to removable media data storage units such as a "Request Element Status" command.

For example, when a "Request Element Status" command is sent by the host or server computer network to one or more removable media data storage units, the removable media data storage system controller virtualizes the seven tape sets in a fifteen tape configuration, so that the host computer sees only seven slots, not fifteen. Further, when the host or server computer network tells the removable media data storage system controller to "Load Set One", the removable media data storage system controller knows independently of the host computer what individual removable media data storage units are included in Set One. Therefore, while the host computer expects that its instruction to "Load Set One" loads a removable media data storage unit into a data reader or a data writer, the first level removable media data storage system controller in the cascade will be passing this instruction on to the second level removable media data storage system controllers. The second level removable media data storage system controllers will now direct the robotic control to load a set of removable media data storage units within the removable media library into the data readers or data writers and then report this event back up through the second level and the first level removable media data storage system controllers to the host or server computer network. The second level and the first level removable media data storage system controllers will virtualize the set of removable media data storage units that has been loaded into the data readers or data writers to appear to the host computer as "Set One", irrespective of the actual individual removable media data storage units on which the data is stored.

Basic Cascade

Figure 3:
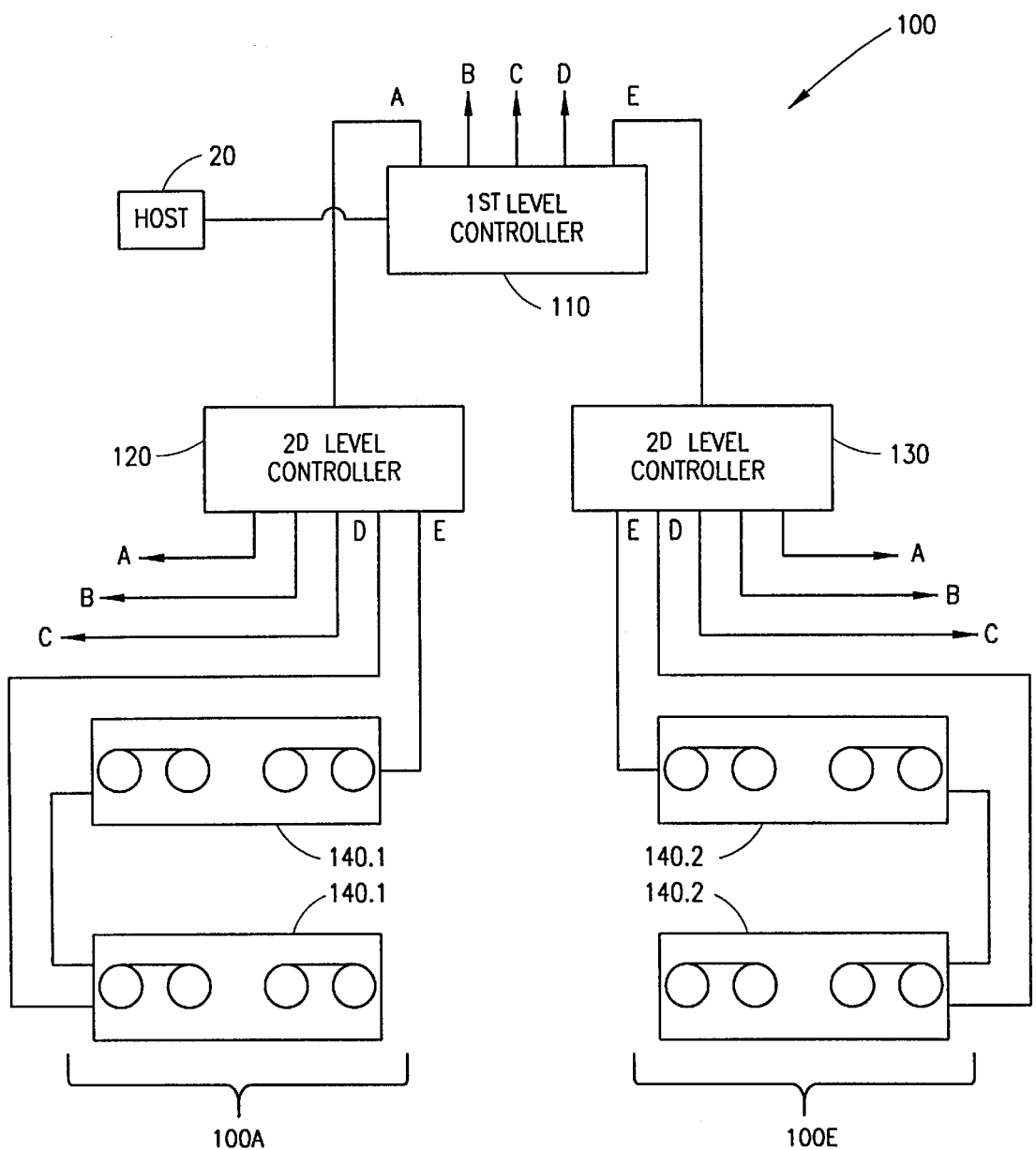
FIG. 3 is a schematic representation of the basic cascaded removable media data storage system of the present invention.

By specific reference to the basic cascaded removable media data storage system 100 shown in FIG. 3, when the first level removable media data storage system controller 110 connected to the host computer 20 receives a command from the host computer 20 it can pass the command down the left side 100A of the cascaded data storage system 100 or the right side 100E of the cascaded data storage system 100 depending on the imbedded rule set within the removable media data storage system controller 110. The data will end up following a path to a configuration of removable media data storage units 140.1 or 140.2 adequate to meet the data storage write or read requirements of the host or server computer network 20. Such path could be a fault tolerant path established because of a hardware or software malfunction or it could be a mirror split to an identical configuration of removable media data storage units in another branch of the system. If desired, the command from the host computer 20 may be passed through the first level removable media data storage system controller 110 to a tape compatible, for example, RAID or through one of the two second level removable media storage system controllers 120, 130 to a tape compatible RAID connected to one of more of open channels A, B, or C extending from each of the second level removable media storage system controllers 120, 130.

In the preferred embodiment of the basic cascaded removable media data storage system 10 of the present invention, it was found that certain features had to be added to all of the removable media data storage system controllers 110, 120, and 130 to make the cascaded removable media data storage system 10 of the present invention operational. These added features were built around removable media data storage system controllers 110, 120, and 130 which have five channels A, B, C, D, and E. These five channels allow for the removable media data storage system controllers to have a mirrored set of removable media data storage units 140.1 and 140.2 and a redundant fault tolerance data storage system. Such configuration is known as a 2+1 RAID 3 data storage system. In a 2+1 RAID 3 data set the first level removable media data storage system controller 110 appears as two data storage devices to the host computer, not just one. Therefore, according to the present invention, it is possible for a removable media data storage system controller to support not only a mirrored configuration of removable media data storage units, but by using its three remaining channels, it can support a 2+1 RAID 3 data storage system. The basic cascaded removable media data storage system 100 shown in FIG. 3 is a single level cascade which features two mirrored sets of removable media data storage units 140, 140.1, 140.2, schematically shown in left and right branches 100A, 100E in FIG. 3, and accessibility to three RAID sets with just three removable media data storage system controllers 110, 120, and 130. This basic single level cascade 100 gives the host computer 20 access to seven volumes of removable media data storage with just three removable media data storage system controllers 110, 120, and 130; rather than access to seven volumes of removable media data storage with seven removable media data storage system controllers according to the serial configuration depicted in FIG. 1.

Alternate Embodiments

Figure 4:
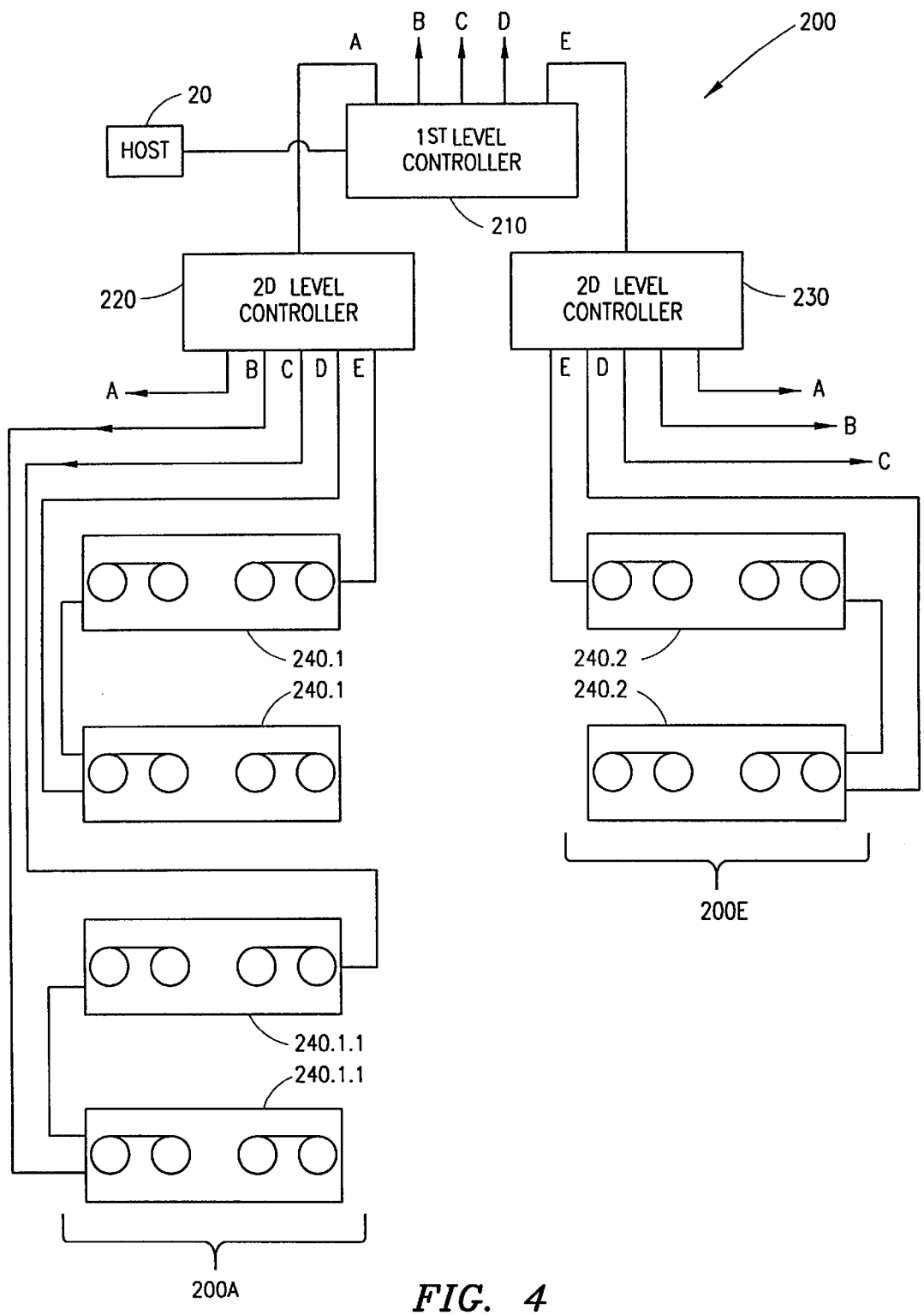
FIG. 4 is a schematic representation similar to FIG. 3 including additional removable media data storage capacity on one side of the system.

In FIG. 4 is shown a second embodiment 200 of the cascaded removable media data storage system of the present invention. All components and the relative positions of those components within the cascade 200 have similar reference numbers to those shown in FIG. 3 except that the reference numbers include a "2" in the hundreds place. Added to the second level removable media data storage system controller 220 on the left side 100A of the cascade 200 is an additional set of removable media data storage units 240.1.1 which has been connected to channels B and C from the second level removable media data storage system controller 220.

Figure 5:
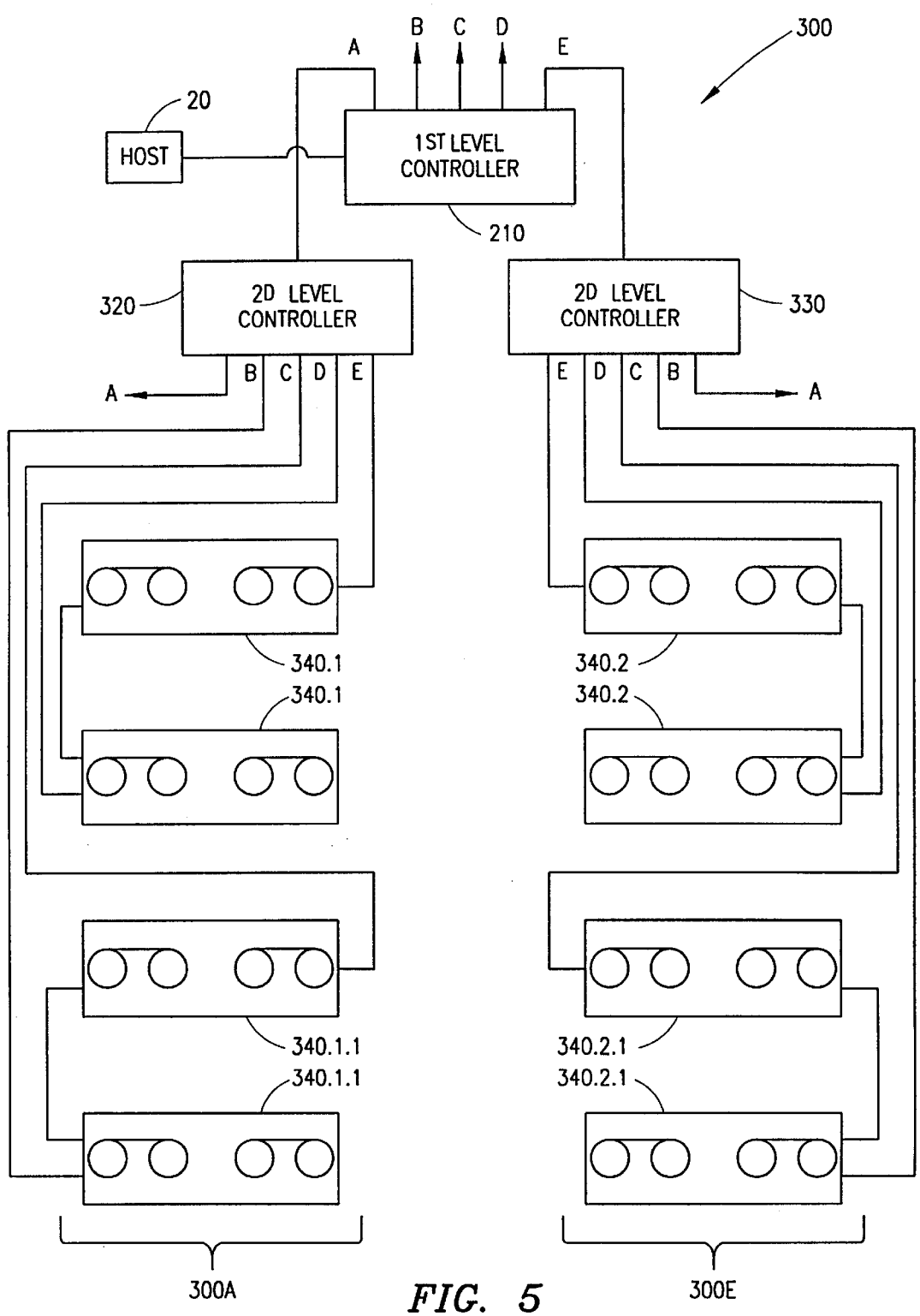
FIG. 5 is a schematic representation of the cascaded removable media data storage system of the present invention including additional removable media data storage capacity on both sides of the system.

Shown in FIG. 5 is a third embodiment 300 of the cascaded tape data storage system of the present invention. The reference numbers for similar components are the same as in the previous embodiments; however, a numeral "3" has been added to the reference numbers in the hundreds place. The third embodiment 300 is distinguishable from the second embodiment 200 in that an additional set of removable media data storage units 340.2.1 has been added to the right side 300E of the cascade 300. The additional set of removable media data storage units 340.2.1 is attached to channels C and D from the second level removable media storage data system controller 330.

Figure 6:
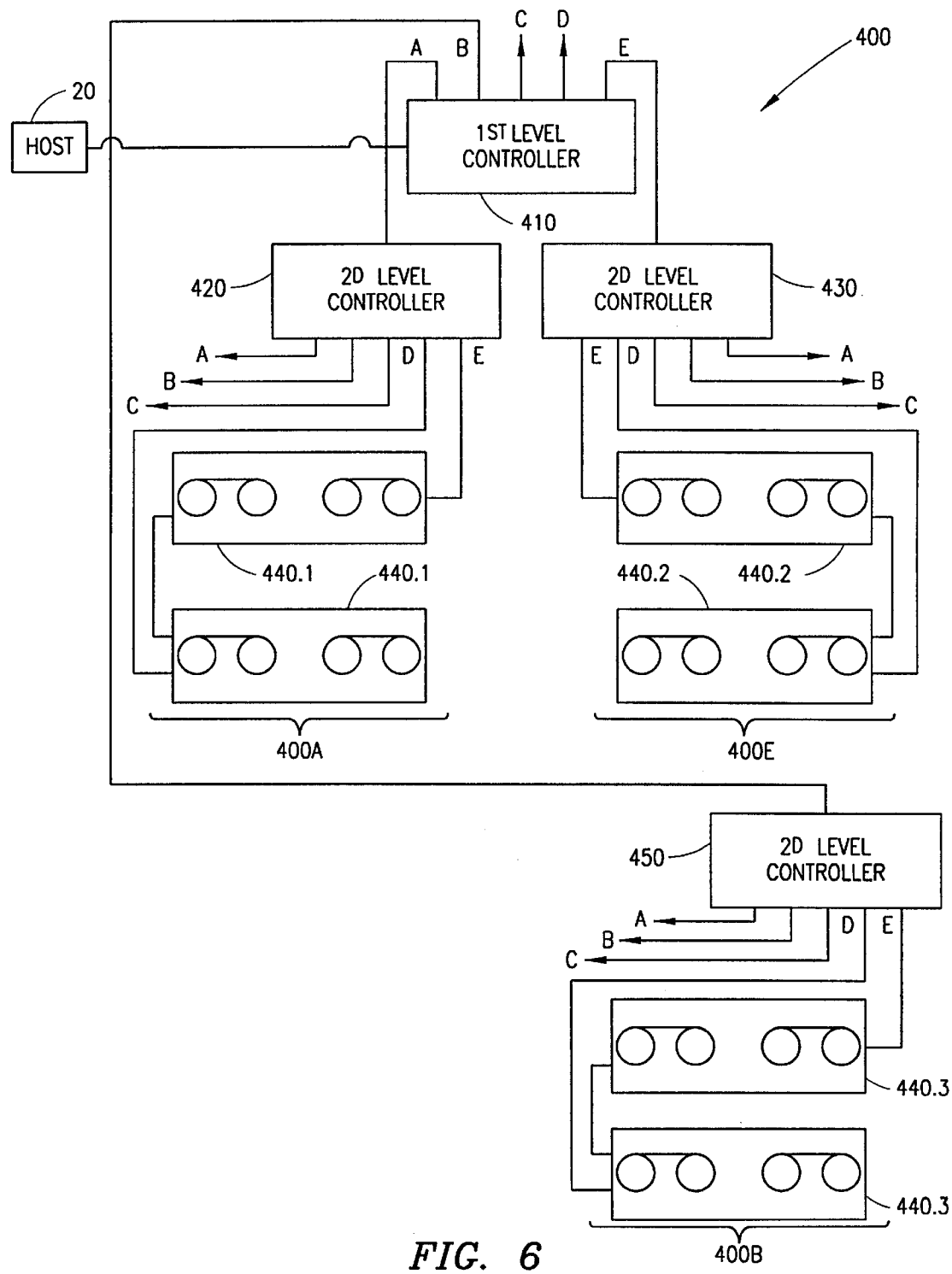
FIG. 6 is a schematic representation of the basic cascaded removable media data storage system of the present invention including a third mirrored group of removable media data storage units.

The fourth embodiment 400 of the invention is depicted in FIG. 6. Similar components having a similar location in the system are designated by the same reference numerals with the exception of a numeral "4" in the hundreds place. In this fourth embodiment 400, a third mirrored cascade 400B of removable media data storage units 440.3 is added at channel B from the first level removable media data storage system controller 410. Accordingly, there are three sets of removable media data storage units 440.1, 440.2 and 440.3 connected through second level removable media data storage system controllers 420, 430 and 450 to the first level removable media data storage system controller 410.

Figure 7:
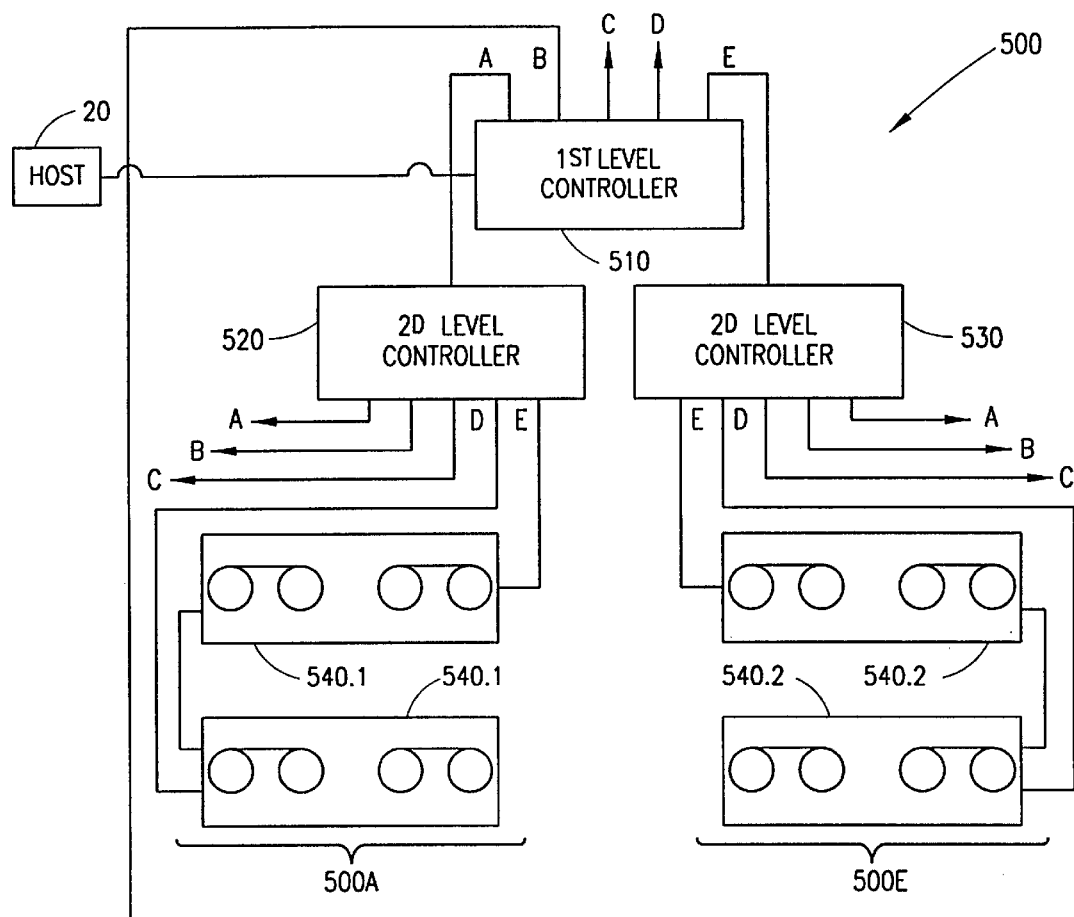
FIG. 7 is a schematic representation of a cascaded storage system array similar to that shown in FIG. 6 with additional removable media data storage capacity added to the third mirrored group of removable media data storage units.
Figure 7:
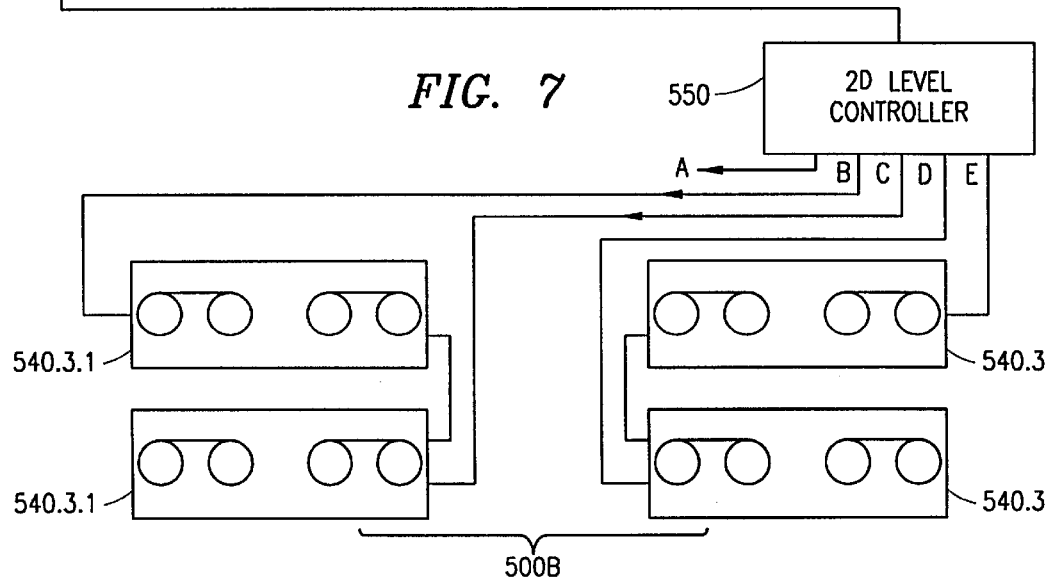

Depicted in FIG. 7 is a fifth embodiment 500 of the cascaded removable media data storage system of the present invention. Similar components having similar positions within the system are designated by similar reference numbers with the exception of a "5" in the hundreds place. The difference between the fifth embodiment 500 and the prior embodiments is the same as the difference between the embodiment 200 shown in FIG. 4 and the basic system 100 shown in FIG. 3. Specifically, an additional set of removable media data storage units 540.3.1 has been added to a mirrored cascade 500B of removable media data storage units connected to channel B of the first level removable media data storage system controller 510.

Figure 8:
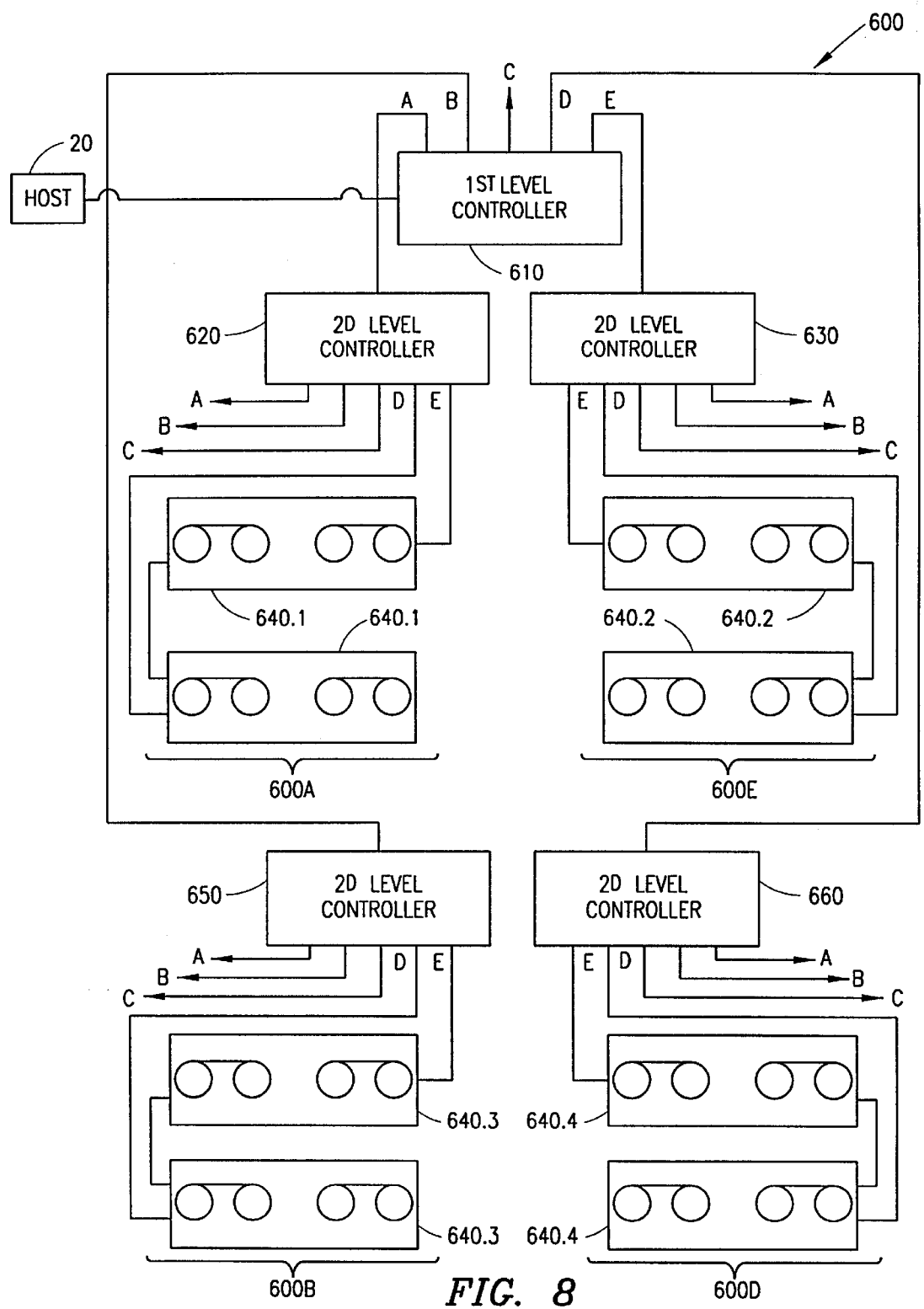
FIG. 8 is a cascaded data storage system array similar to FIG. 6 with a fourth mirrored group of removable media data storage units.

Shown in FIG. 8 is a sixth embodiment 600 of the cascaded removable media data storage system of the present invention. Similar components having a similar position within the system are designated by the same reference numbers except for the addition of a "6" in the hundreds place. In the sixth embodiment 600, a fourth mirrored cascade 600D of removable media data storage units is connected to channel D on the first level removable media data storage system controller 610. Like the other branches, the fourth mirrored cascade 600D of removable media data storage units 640.4 includes a second level removable media data storage system controller 660 and removable media data storage units 640 connected to channel D of the first level removable media data storage system controller 610.

Figure 9:
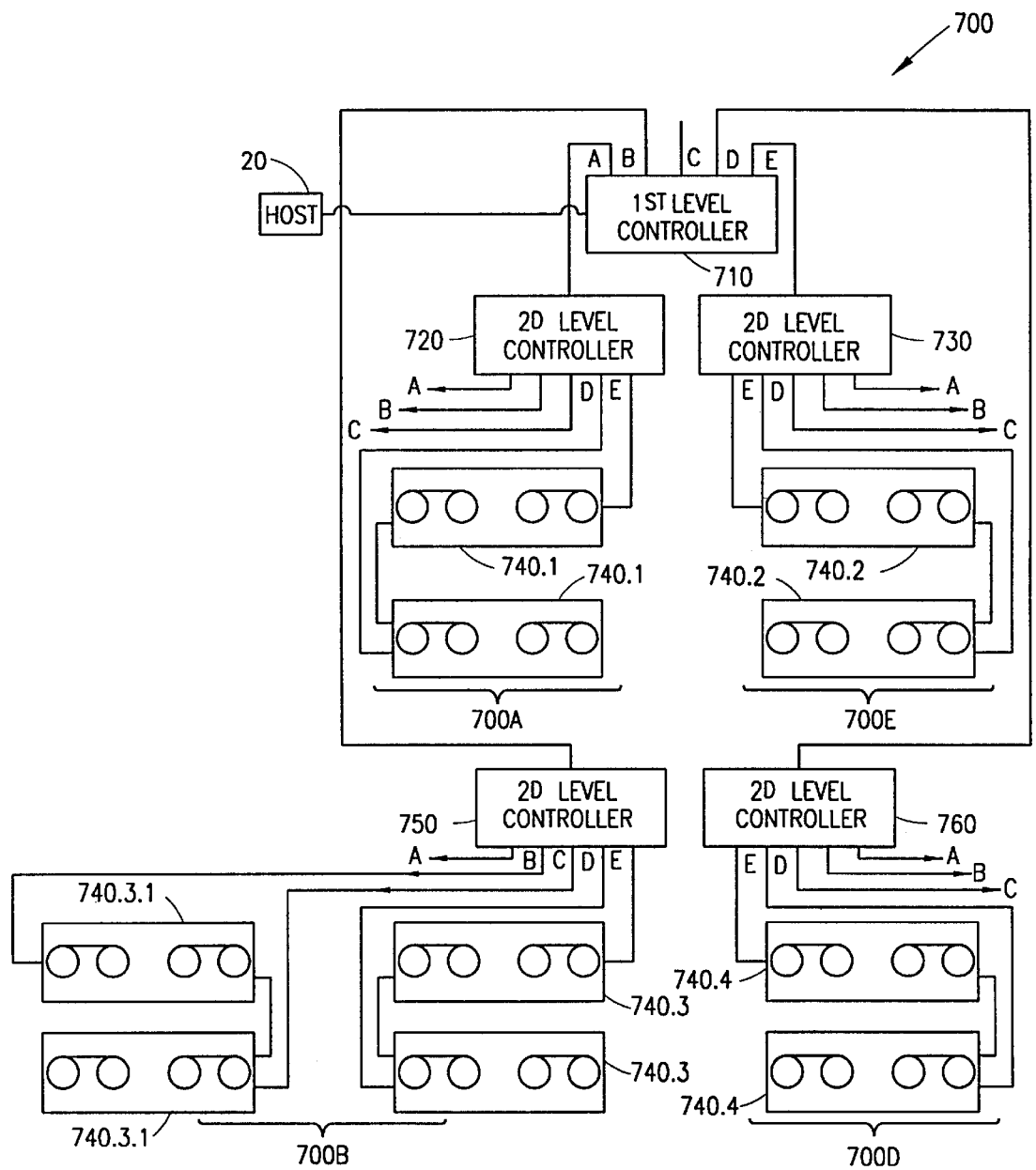
FIG. 9 is a cascaded data storage system similar to that shown in FIG. 8 with additional removable media data storage capacity added to the third mirrored of removable media data storage units.

A seventh embodiment 700 of the present invention is shown in FIG. 9. Similar components having a similar position within the cascaded system are designated by similar reference numbers with the exception of the number "7" in the hundreds place. The embodiment 700 shown in FIG. 9 is similar to the embodiment 600 shown in FIG. 8 in that there are four second level removable media data storage system controllers 720, 730, 750, and 760 which are connected to four of the five channels A, B, D and E on the first level removable media data storage system controller 710. Much like the fifth embodiment 500 shown in FIG. 7, an additional set of removable media data storage units 740.3.1 has been added to the additional branch 700B connected to channel B on the first level removable media data storage system controller 710.

Figure 10:
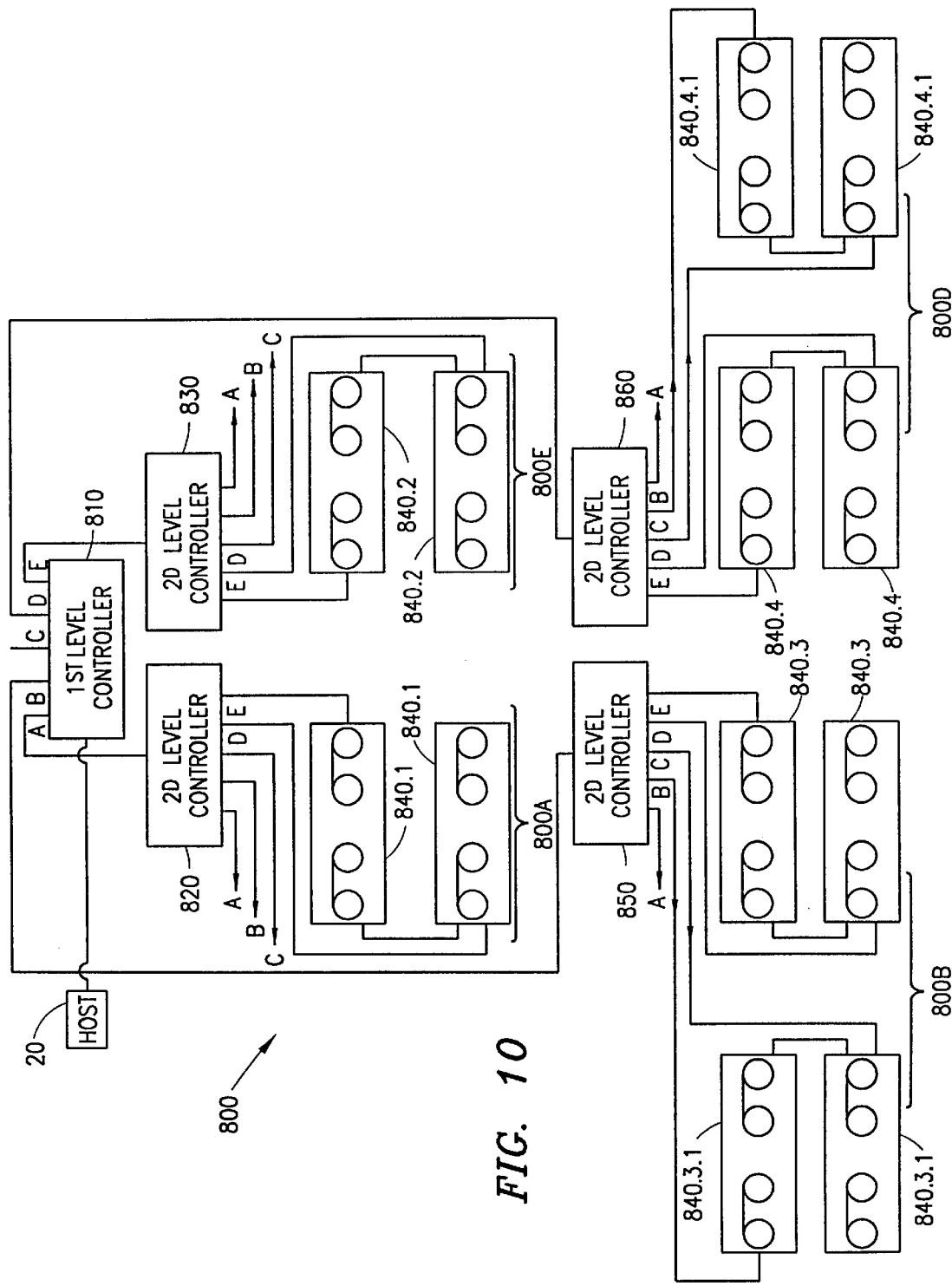
FIG. 10 is a cascaded data storage system similar to that shown in FIG. 8 with additional removable media data storage capacity added to both the third and fourth mirrored of removable media data storage units.

Shown in FIG. 10 is an eighth embodiment 800 of the system of the present invention. Similar reference numbers have been used to designate similar components in a similar location within the system with the exception of the numeral "8" appearing in the hundreds place. Much like the seventh embodiment 700 shown in FIG. 9 differs from the sixth embodiment 600 shown in FIG. 8 by the addition of extra removable media data storage units to one mirrored group of removable media data storage units branch 700B of the cascaded system 700, the eighth embodiment 800 differs from the seventh embodiment 700 shown in FIG. 9 by the addition of a second set of removable media data storage units 840.4.1 to another mirrored cascade 800D of removable media data storage units in the cascaded system 800.

Figure 11:
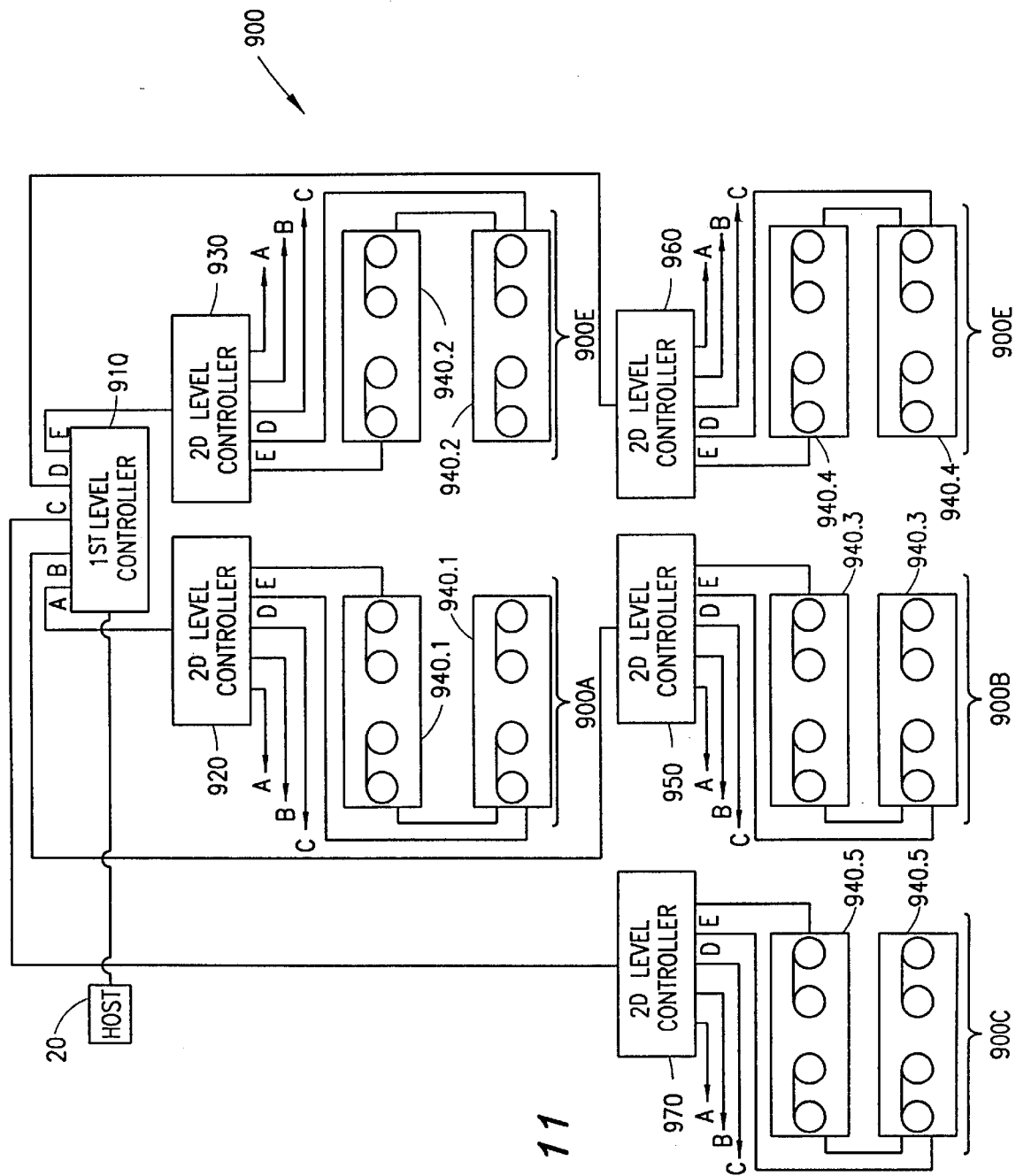
FIG. 11 is a cascaded data system storage similar to that shown in FIG. 8 including a fifth mirrored group of removable media data storage units.

Shown in FIG. 11 is a ninth embodiment 900 of the cascaded removable media data storage system of the present invention. Similar components having similar locations within the system 900 have been designated by similar reference numbers as in the prior embodiments with the exception of a "9" in the hundreds place. The ninth embodiment 900 of the cascaded 900C system of the present invention differs from prior embodiments in that a fifth mirrored cascade of removable media data storage units 940.5 extends from channel C in the first level removable media data storage system controller 910. This branch includes a second level removable media data storage system controller 970 and removable media data storage units 940.5 as in the other mirrored cascades of removable media data storage units.

Figure 12:
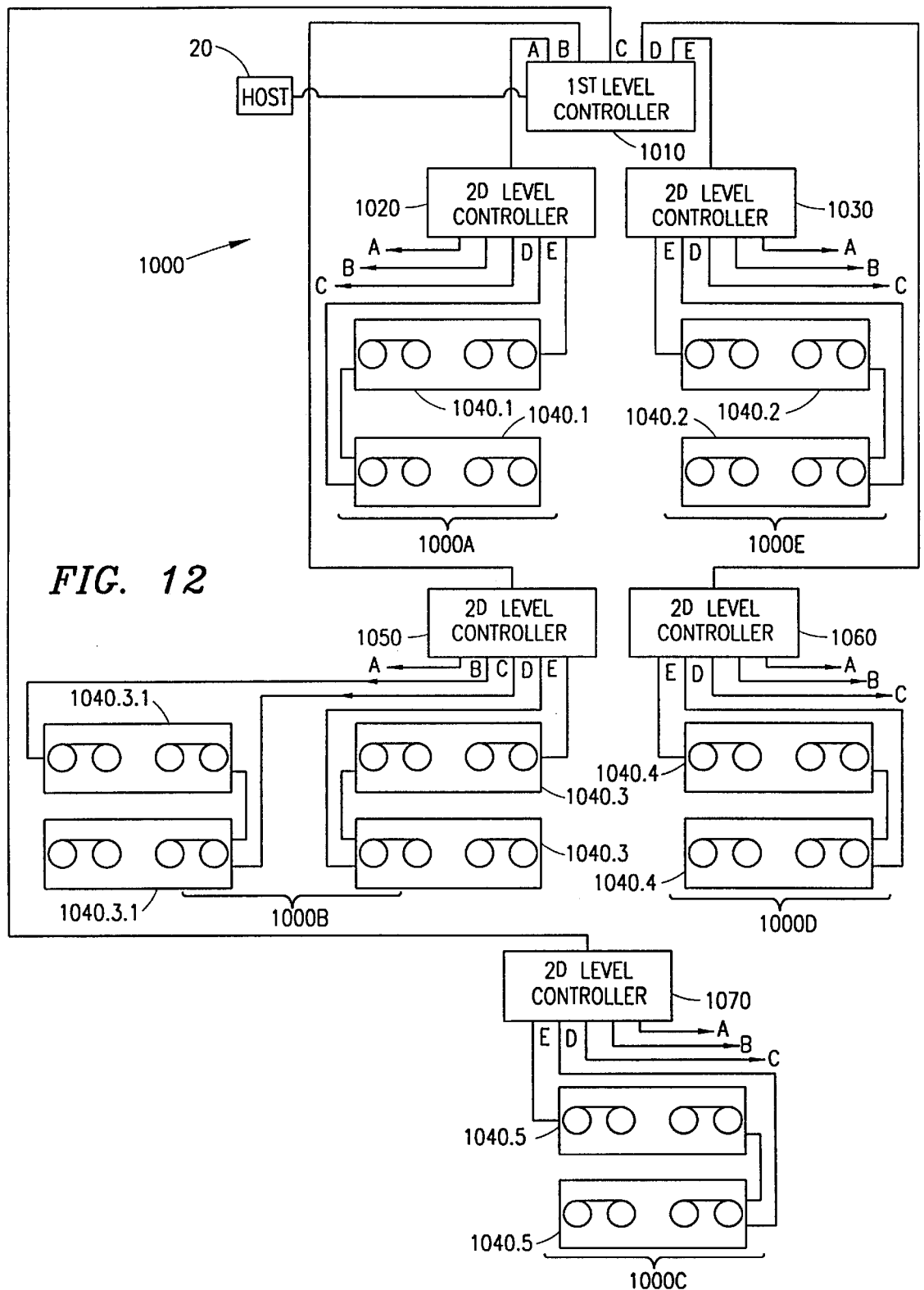
FIG. 12 is a cascaded data storage system similar to that shown in FIG. 11 with additional removable media data storage capacity added to the third mirrored group of removable media data storage units.

Shown in FIG. 12 is a tenth embodiment 1000 of the instant invention. Similar reference numbers have been used with similar components having a similar position within the system with the exception of a "10" in the hundreds place. The tenth embodiment 1000 is similar to the ninth embodiment 900 shown in FIG. 11 in that there are 5 mirrored cascades of removable media data storage units 1040A, 1040B, 1040C, 1040D and 1040E connected to the first level removable media data storage system controller 1010. The data storage capacity of this embodiment 1000 has been increased over the ninth embodiment 900 shown in FIG. 11 by adding additional removable media data storage units 1040.3.1 connected to the second level removable media data storage system controller 1050.

Figure 13:
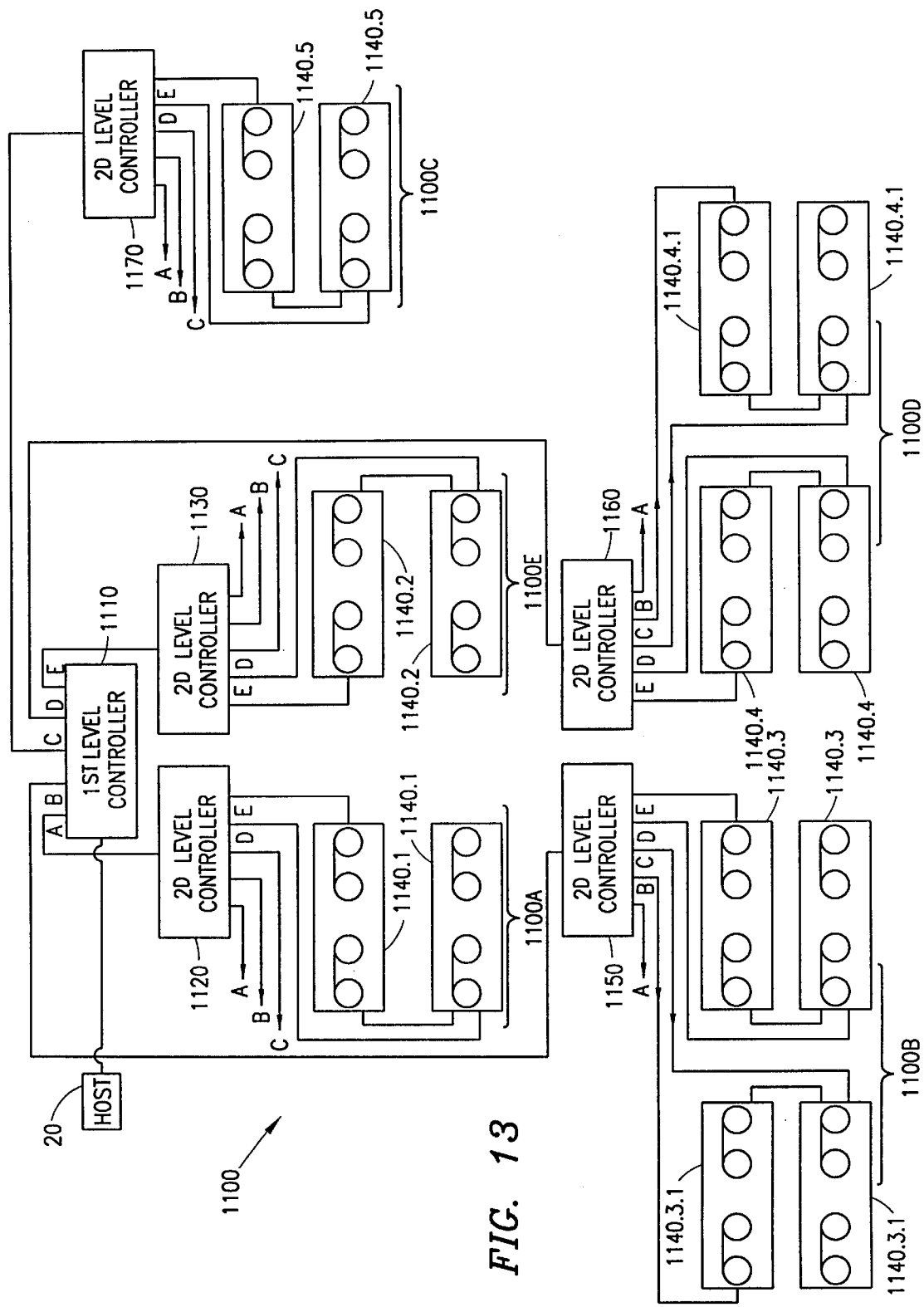
FIG. 13 is a cascaded data storage system similar to that shown in FIG. 11 with additional removable media data storage capacity added to both the third and fourth mirrored groups of removable media data storage units.

The eleventh embodiment 1100 of the cascaded data storage system of the present invention is shown in FIG. 13. Similar reference numbers have been given to similar components having a similar location within the cascaded data storage system; however, the numeral "11" has been placed in the hundreds place. Just as additional removable media data storage capacity 1040.3.1 has been added to the mirrored cascade of removable media data storage units 1040.3 connected to second level removable media data storage system controller 1050 in the tenth embodiment 1000, additional removable media data storage units 1140.1 have been added to the mirrored cascade of removable media data storage units connected to the second level removable media data storage system controller 1160 in the eleventh embodiment 1100.

Figure 14:
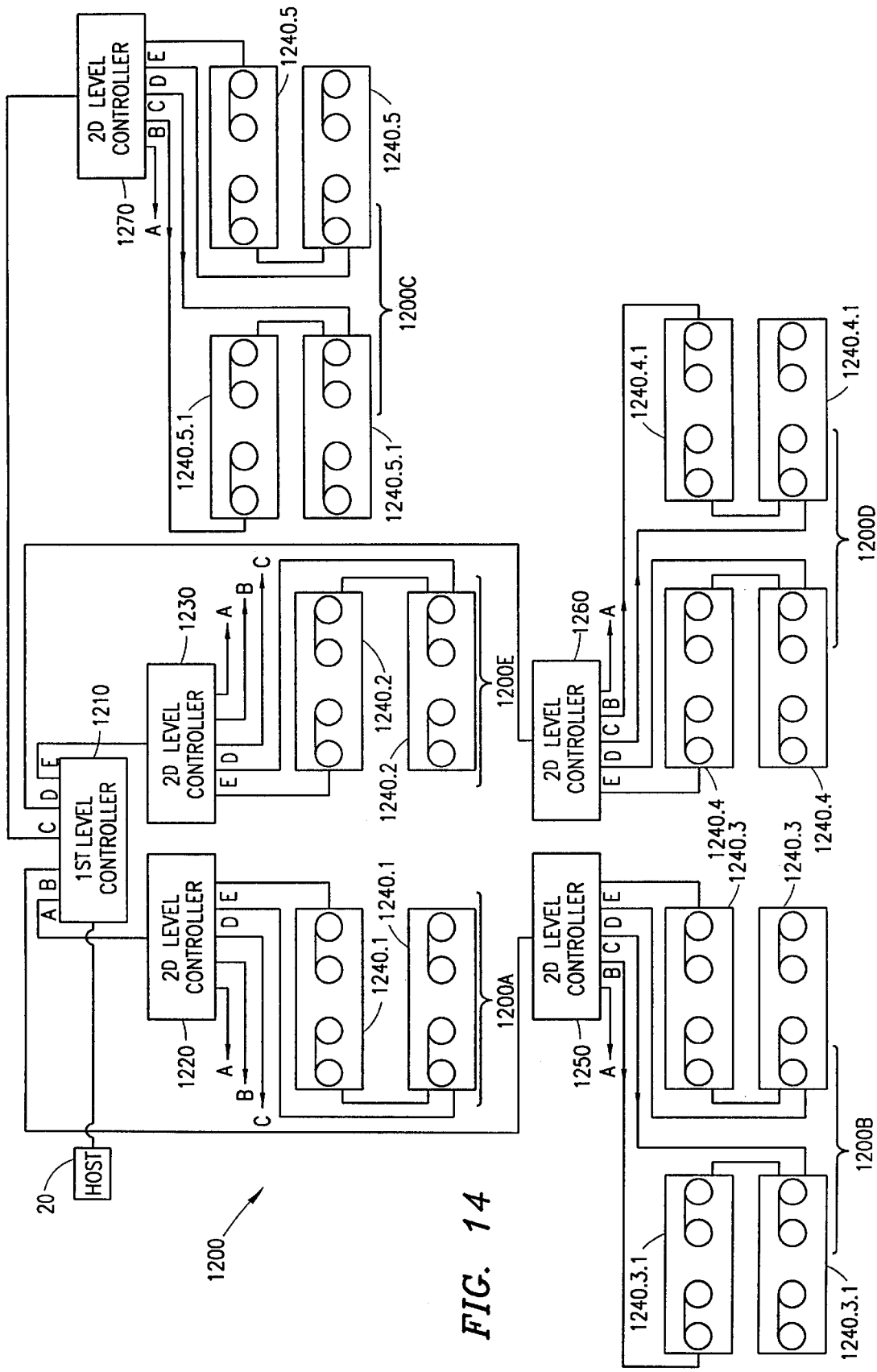
FIG. 14 is a cascaded data storage system similar to that shown in FIG. 11 with additional removable media data storage capacity added to the third, fourth and fifth mirrored groups of removable media data storage units.

Shown in FIG. 14 is a twelfth embodiment 1200 of the cascaded system of the present invention. Similar reference numbers have been used to identify similar components as in the prior embodiments with the addition of numeral "12" in the hundreds place. Much like additional removable media data storage units 1030.3.1 and 1140.4.1 have been added to mirrored cascades 1000B, 1100D of the cascaded data storage system in the prior two embodiments 1000, 1100, the embodiment 1200 illustrated in FIG. 14 adds additional removable media data storage units 1240.5.1 to a third mirrored cascade 1200 of removable media data storage units 1240.5.

It will be understood by those of ordinary skill in the art that it is possible to add additional removable media data storage units to each one of the second level removable media data storage system controllers. If desired, however, the open channels on each second level removable media data storage system controller may be attached to a variety of different data storage devices provided the data storage devices can adequately receive commands from the second level removable media data storage system controllers.

While the preferred and several alternate embodiments of the instant invention have been described above, those of ordinary skill in the art will understand that still other embodiments of the instant invention are possible once having understood the foregoing disclosure. Such other embodiments shall be included within the scope and meaning of the appended claims.

What is claimed is:

1. An enhanced removable media data storage system controller portion connected to one or more individual removable media data storage units for back-up storage of data from a host computer, the enhanced removable media data storage system controller comprising:

means for virtualizing functionality commands from a host computer to a robotic control of one or more removable media data storage units such that the host computer may control the activity of the one or more removable media data storage units as a single entity;

means for virtualizing status commands from the robotic control of one or more removable media data storage units to a host computer such that the host computer may perceive the one or more removable media data storage units as a single entity and;

means for creating a path for data travel to a mirrored group of one or more removable media data storage units.

2. The enhanced removable media data storage system controller as defined in claim 1 wherein said removable media data storage system controller has five channels.

3. A removable media data storage system controller portion of removable media data storage unit for back-up storage of data from a host computer, the removable media data storage system controller comprising:

means for virtualizing functionality commands from a host computer to a robotic control of one or more removable media data storage units such that the host computer may control the activity of the one or more removable media data storage units as a single entity;

means for virtualizing status commands from the robotic control of one or more removable media data storage units to a host computer such that the host computer may perceive the one or more removable media data storage units as a single entity and;

means for creating a path for data travel to either mirrored group of one or more removable media data storage units or a 2+1 RAID.

4. The enhanced removable media data storage system controller as defined in claim 3 wherein said 2+1 RAID includes one or more removable media data storage units.

5. The enhanced removable media data storage system controller as defined in claim 3 wherein said improved removable media data storage system controller has five channels.

6. A cascaded removable media data storage system comprising:

a first level removable media data storage system controller;

at least two second level removable media data storage system controllers connected in parallel to the first level removable media data storage system controller;

one or more removable media data storage units connected to each of the at least two second level removable media data storage system controllers;

each of the second level removable media data storage system controllers comprising:

means for determining the presence of connections to other removable media data storage system controllers in the cascaded removable media data storage system;

means for virtualizing functionality commands from a host computer to a robotic control of one or more removable media data storage units such that the host computer may control the activity of the one or more removable media data storage units as a single entity;

means for virtualizing status commands from the robotic control of one or more removable media data storage units to a host computer such that the host computer may perceive the one or more removable media data storage units as a single entity and;

means for creating a path for data travel to a mirrored group of one or more removable media data storage units.

7. The cascaded removable media data storage system as defined in claim 6 wherein each of said removable media data storage system controllers has five channels.

8. A cascaded removable media data storage system comprising:

a first level removable media data storage system controller;

at least two second level removable media data storage system controllers connected in parallel to the first level removable media data storage system controller;

one or more removable media data storage units connected to each of the at least two second level removable media data storage system controllers;

each of the removable media data storage system controllers comprising:

means for determining the presence of connections to other removable media data storage system controllers in the cascaded removable media data storage system;

means for virtualizing functionality commands from a host computer to a robotic control of one or more removable media data storage units such that the host computer may control the activity of the one or more removable media data storage units as a single entity;

means for virtualizing status commands from the robotic control of one or more removable media data storage units to a host computer such that the host computer may perceive the one or more removable media data storage units as a single entity and;

means for creating a path for data travel to a mirrored group of one or more removable media storage units or a 2+1 RAID.

9. The cascaded removable media data storage system as defined in claim 8 wherein said 2+1 RAID includes one or more removable media data storage units.

10. The cascaded removable media data storage system as defined in claim 8 where each of said removable media data storage system controllers has five channels.

11. The cascaded removable media data storage system as defined in claim 6 wherein said first level removable media data storage system controller which is connected to at least two second level removable media data storage system controllers further includes at least one additional second level removable media data storage system controller connected to one of said at least two second level removable media data storage system controllers.

12. The cascaded removable media data storage system as defined in claim 8 wherein said first level removable media data storage system controller which is connected to at least two second level removable media data storage system controllers further includes at least one second level removable media data storage system controller connected to at least one of said second level removable media data storage system controllers.

13. A computer network comprising:

at least one host computer;

the at least one host computer connected to a cascaded removable media data storage system;

the cascaded removable media data storage system comprising:

a first level removable media data storage system controller;

at least two second level removable media data storage system controllers connected in parallel to the first level removable media data storage system controller;

one or more removable media data storage units connected to each of the at least two second level removable media data storage system controllers;

each of the second level removable media data storage system controllers comprising:

means for determining the presence of connections to other removable media data storage system controllers in the cascaded removable media data storage system;

means for virtualizing functionality commands from a host computer to a robotic control of the one or more removable media data storage units such that the host computer may control the activity of the one or more removable media data storage units as a single entity;

means for virtualizing status commands from the robotic control of the one or more removable media data storage units to the at least one host computer such that the host computer may perceive the one or more removable media data storage units as a single entity and;

means for creating a path for data travel to a mirrored group of one or more removable media data storage units.

14. The computer network as defined in claim 13 where in each of said removable media data storage system controllers has five channels.

15. A computer network comprising:

at least one host computer;

the at least one host computer connected to a cascaded removable media data storage system;

the cascaded removable media data storage system comprising:

a first level removable media data storage system controller;

at least two second level removable media data storage system controllers connected in parallel to the first level removable media data storage system controller;

one or more removable media data storage units connected to each of the at least two second level removable media data storage system controllers;

each of the second level removable media data storage system controllers comprising:

means for determining the presence of connections to other removable media data storage system controllers in the cascaded removable media data storage system;

means for virtualizing functionality commands from the at least one host computer to a robotic control of the one or more removable media data storage units such that the at least one host computer may control the activity of the one or more removable media data storage units as a single entity;

means for virtualizing status commands from the robotic controller portion of the one or more removable media data storage units to the at least one host computer such that the at least one host computer may perceive the one or more removable media data storage units as a single entity and;

means for creating a path for data travel to either a mirrored group of one or more removable media data storage units or a 2+1 RAID.

16. The computer network as defined in claim 15 wherein said 2+1 RAID includes one or more removable media data storage units.

17. The computer network as defined in claim 15 wherein each of said removable media data storage system controllers has five channels.

18. The computer network as defined in claim 13 wherein the first level removable media data storage system controller which is connected to at least two second level removable media data storage system controllers comprises at least one second level removable media data storage system controller connected to one of the at least two second level removable media data storage system controllers.

19. The computer network as defined in claim 16 wherein said first level removable media data storage controller connected to at least two second level removable media data storage system controllers further includes at least one second level removable media data storage system controller connected to one of said at least two of said second level removable media data storage system controllers.

* * * * *

UNITED STATES PATENT AND TRADEMARK OFFICE
CERTIFICATE OF CORRECTION

PATENT NO. : 6,295,578 B1
DATED : September 25, 2001
INVENTOR(S) : John E. Dimitroff and David L. Grant It is certified that error appears in the above-identified patent and that said Letters Patent is hereby corrected as shown below:

Claim 13,
Line 62, after "removable" insert -- media --, therefor.

Signed and Sealed this

Fifth Day of March, 2002

Attest:

Attesting Officer

JAMES E. ROGAN
*Director of the United States Patent and Trademark Office*

Disclaimer

6,295,578—John E. Dimitroff; David L. Grant, both of Houston, TX. CASCADED REMOVABLE MEDIA DATA STORAGE SYSTEM. Patent dated September 25, 2001. Disclaimer filed April 22, 2002, by the assignee, Compaq Computer Corporation.

Hereby disclaims and dedicates to the public the entire term of said patent.
*(Official Gazette, July 16, 2002)*